US010584016B2

(12) United States Patent
Laitasalmi et al.

(10) Patent No.: US 10,584,016 B2
(45) Date of Patent: Mar. 10, 2020

(54) METHOD, LOAD HANDLING DEVICE, COMPUTER PROGRAM AND COMPUTER PROGRAM PRODUCT FOR POSITIONING GRIPPING MEANS

(71) Applicant: KONECRANES GLOBAL CORPORATION, Hyvinkää (FI)

(72) Inventors: Heikki Laitasalmi, Kerava (FI); Lasse Eriksson, Espoo (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 186 days.

(21) Appl. No.: 15/559,671

(22) PCT Filed: Mar. 31, 2016

(86) PCT No.: PCT/FI2016/050202
§ 371 (c)(1),
(2) Date: Sep. 19, 2017

(87) PCT Pub. No.: WO2016/156667
PCT Pub. Date: Oct. 6, 2016

(65) Prior Publication Data
US 2018/0282132 A1   Oct. 4, 2018

(30) Foreign Application Priority Data

Apr. 1, 2015   (FI) ...................... 20155232

(51) Int. Cl.
*B66C 13/46* (2006.01)
*G01S 3/04* (2006.01)
(Continued)

(52) U.S. Cl.
CPC .............. *B66C 13/46* (2013.01); *B66C 13/18* (2013.01); *G06T 7/344* (2017.01); *B66C 19/007* (2013.01);
(Continued)

(58) Field of Classification Search
CPC ..... B66C 13/46; B66C 13/085; B66C 13/063; B25J 9/02; E02F 9/20; G06F 17/50;
(Continued)

(56) References Cited

U.S. PATENT DOCUMENTS 4,511,974 A * 4/1985 Nakane ................ G01G 19/083
340/685
5,729,453 A * 3/1998 Lee ........................ B66C 13/063
212/275
(Continued)

FOREIGN PATENT DOCUMENTS

CN         203439940 U    2/2014
CN   WO 2014/053703 A1    4/2014
(Continued)

OTHER PUBLICATIONS

Besl et al., "A Method for Registration of 3-D Shapes", IEEE Transactions on Pattern Analysis and Machine Intelligence, Feb. 1992, vol. 14, No. 2, pp. 239-256.
(Continued)

*Primary Examiner* — Yuri Kan
(74) *Attorney, Agent, or Firm* — Birch, Stewart, Kolasch & Birch, LLP (57) ABSTRACT

A 3D point cloud is formed of the grippers of a load handling device in relation to a device which is moved horizontally above a load in the load handling device and to which the grippers are connected to be moved in the vertical direction. The grippers are positioned in relation to the horizontally movable device by comparing the formed 3D point cloud with at least one 3D model of the grippers.

15 Claims, 1 Drawing Sheet

(51) Int. Cl.
*A01D 57/00* (2006.01)
*G06T 7/33* (2017.01)
*B66C 13/18* (2006.01)
*B66C 19/00* (2006.01)

(52) U.S. Cl.
CPC ............... *G06T 2200/04* (2013.01); *G06T 2207/10028* (2013.01)

(58) Field of Classification Search
CPC .......... G06F 3/033; G06F 19/00; A01D 5/00; A01D 57/00; G01S 3/04; H04N 7/18; G06K 9/62; G06T 7/00; G01G 19/083
See application file for complete search history.

(56) References Cited

U.S. PATENT DOCUMENTS

| | | | | |
|---|---|---|---|---|
| 2001/0038376 | A1* | 11/2001 | Sato | G06F 3/016 345/156 |
| 2002/0024598 | A1* | 2/2002 | Kunimitsu | B66C 13/46 348/159 |
| 2005/0281644 | A1* | 12/2005 | Lussen | B66C 13/085 414/403 |
| 2009/0044505 | A1* | 2/2009 | Huster | A01D 43/087 56/10.2 R |
| 2011/0184544 | A1* | 7/2011 | Ikushima | G05B 19/4093 700/97 |
| 2011/0211066 | A1* | 9/2011 | Fujiki | H04N 7/181 348/135 |
| 2012/0136542 | A1* | 5/2012 | Upcroft | E02F 3/48 701/50 |
| 2013/0051647 | A1* | 2/2013 | Miao | G06T 7/344 382/132 |
| 2013/0335271 | A1* | 12/2013 | Lim | G01S 19/14 342/386 |
| 2014/0008928 | A1* | 1/2014 | Collado Jimenez | B25J 15/0061 294/183 |
| 2014/0037194 | A1* | 2/2014 | Kitamura | G01B 11/24 382/154 |
| 2015/0329333 | A1* | 11/2015 | Fenker | B66C 13/46 212/225 |
| 2016/0002882 | A1* | 1/2016 | Kanari | E02F 3/435 701/50 |

FOREIGN PATENT DOCUMENTS

| | | |
|---|---|---|
| DE | 20 2012 012 116 U1 | 3/2014 |
| DE | 10 2012 020 953 A1 | 4/2014 |
| EP | 2 574 587 A1 | 4/2013 |
| FI | 111243 B | 6/2003 |
| FI | 20126027 | 4/2014 |
| JP | 2013-159480 A | 8/2013 |
| JP | 2013159480 A * | 8/2013 ............ B66C 13/46 |
| WO | WO 2009/08538 A2 | 2/2009 |
| WO | WO 2014/046213 A1 | 3/2014 |

OTHER PUBLICATIONS

Finnish Search Report, issued in Priority Application No. 20155232, dated Dec. 1, 2015.
International Search Report, issued in PCT/FI2016/050202, dated Jun. 13, 2016.
Written Opinion of the International Searching Authority, issued in PCT/FI2016/050202, dated Jun. 13, 2016.

* cited by examiner

METHOD, LOAD HANDLING DEVICE, COMPUTER PROGRAM AND COMPUTER PROGRAM PRODUCT FOR POSITIONING GRIPPING MEANS

BACKGROUND OF THE INVENTION

The invention relates to load handling and specifically to the positioning of gripping means of a load handling device.

Gripping means, such as hooks, are used by cranes to attach to loads that are being handled. Information on the location of the hook is used for crane operations to enable precise and fast handling of loads. To determine the location of the hook, the hook may be equipped with a reflecting sheet or an electric device that produces an active beam. It is worthwhile to keep the reflection sheets relatively clean to make it possible to determine the location of the hook based on them. On the other hand, electric devices installed on the hook may be damaged as a result of impacts or a manufacturing fault. During servicing operations, the crane is out of practical use, causing its degree of utilization to decrease. The operation of a plurality of cranes may be interdependent, whereby servicing operations on one crane may reduce the load handling capacity of the other cranes or a load handling device in the operating area, such as a production facility, storage building, or dock area.

BRIEF DESCRIPTION OF THE INVENTION

An aspect of the invention relates to the subject matter of the independent claims. Some embodiments are disclosed in the dependent claims.

Some embodiments make it possible to position the gripping means without accessories installed on them.

BRIEF DESCRIPTION OF THE FIGURES

The invention is now described in closer detail in connection with preferred embodiments and with reference to the accompanying drawings, in which.

DETAILED DESCRIPTION OF THE INVENTION

Figure 1:
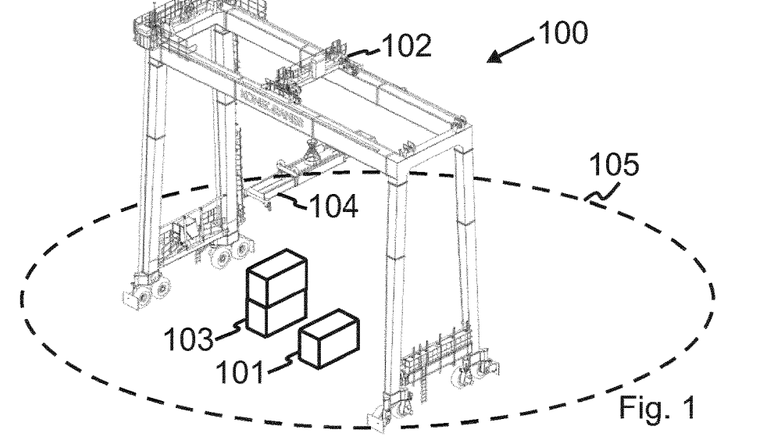
FIG. 1 shows a load handling device according to an embodiment.

FIG. 1 shows a load handling device 100 according to an embodiment. The load handling device has an operating area 105, within which it handles a load 101 or loads 103. The loads may be stacked on top of each other to form load stacks 103. Examples of loads comprise containers, aluminium coils, steel coils and tanks. Containers, such as shipping containers handled at ports, are boxlike transport units having standard dimensions, either 20, 40 or 45 feet in length. A container is about 2.5 metres in width, and the most typical container heights are about 2.6 metres and 2.9 metres. A load handling device can grab a load with gripping means 104, such as a hook, lines, magnet, ropes, paper roll grapple, suction loader, clamps, and/or container grabber. With gripping means, a load may be handled by stacking, gripping, and/or moving the load within the operating area. Loads may be handled on a suitable platform, such as on the ground, on the floor of a production facility, on top of a vehicle or on top of another load.

Out of the gripping means referred to in the above, a hook is advantageous in the sense that it does not, in principle, require electrification to achieve the actual gripping, unlike a container grabber, a roll clamp used in steel industry, or a paper roll grapple, for example. Therefore, the solutions to position a hook should advantageously be such that do not require electrification of the hook.

The operating area of a load handling device may comprise an area, such as a production facility, storage building or port area, where the load handling device may move the load from one place to another by grabbing the load and moving in the area. The operating area may also be an area where the load handling device moves the load without moving itself. The operating area of a load handling device may also be a combination of the above areas.

Examples of load handling devices comprise a crane, such as an industrial crane or a harbour crane. The type of the crane may be a gantry crane, bridge crane, rubber-tired gantry crane (RTG), rail-mounted gantry crane (RMG), or straddle carrier. An electrical bridge crane may be referred to as an electric overhead travelling crane (EOT).

In an embodiment, the load handling device 100 comprises a device 102 that is moved horizontally above the load and that has a loading element, to be moved substantially vertically, between the load and the device moved substantially horizontally, for positioning on top of the load. This type of load handling device may be a bridge crane or gantry crane, in which the horizontally movable device is a hoist trolley that is movable on a bridge connecting the vertical supports of the crane. The hoist trolley has a hoisting mechanism to which gripping means are coupled to move as the element positioned vertically on top of the load. The gripping means may be any one of those described above. The hoist trolley may be at a height, such as 23 m, that permits the handling of load stacks below the load handling device. The height referred to in the above specifically represents a height typical for a harbour crane. It should be noted that for harbour cranes, industrial cranes and process cranes of various kind, the heights may differ from a few metres to several tens of metres.

Instead of a hoist trolley, the device moved horizontally may also be another device that may be moved horizontally on top of a load or load stack. Examples of a device moved horizontally comprise devices that have a hoisting mechanism. The hoisting mechanism may be connected to a rope, in which case the rope may be moved up and/or down in order to lift or lower a load supported by the rope.

The vertical supports comprise, depending on the type of the load handling device and/or operating environment of the load handling device, gantry crane legs or other support structures, for example, which support the horizontally movable device in the vertical direction on top a load or load stack. Buildings or their parts in the operating area of the load handling device may act as the support structure, for example. The device moved in the horizontal direction may be located between the support structures, for example, whereby the device moved in the horizontal direction moves between the support structures. On the other hand, the support structures may be located on only one side of the device moved horizontally, whereby the device moved horizontally may move horizontally to different distances from the support structures.

Figure 2:
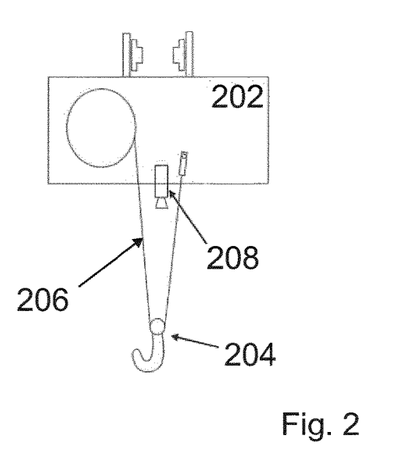
FIG. 2 shows a device moved horizontally above a load in accordance with an embodiment.

FIG. 2 shows a device 202 moved horizontally above a load in accordance with an embodiment. The device moved horizontally may have been installed or may be installable on the load handling device, such as one of the load-handling devices referred to in the above. The horizontally movable device may be a hoist trolley that is movable on a bridge connecting the vertical supports of the crane. The horizontally movable device comprises gripping means 204, 206, which may be attached to a load to handle the load. The gripping means are connected to the horizontally movable device for movement in the vertical direction. This way the gripping means may be lifted and lowered, whereby their distance to the load and/or ground may be adjusted. At the same time a horizontally movable device makes it possible to move the gripping means in the horizontal direction when a load is handled. Movement in the horizontal and vertical direction allows the moving of the gripping means both with a load and without a load in load handling. A positioning device 208 is installed on the horizontal device above the gripping means in such a manner that the positioning device is directed to the gripping means 204. It should be noted that a positioning device may also be mounted in other locations, such as the support structures of a load handling device, or in the operating area of a load handling device so that the positioning device may be directed to the gripping means from its mounting location.

A positioning device produces positioning data, such as image data, of its target. Positioning data may be produced from the measuring area of the positioning device, such as image area. The positioning device is advantageously directed to the gripping means at the place where the gripping means attach to a load. Thus, the direction may advantageously be to the hook or the twist-locks of the container grabber. Twist-locks are located at the corners of the container grabber. A container grabber is used to attach to a container by guiding the twist-locks to openings in the corner pieces of the container, whereby the container attaches by the twist-locks to the container grabber. When needed, a plurality of positioning devices may be installed on the horizontally movable device or on the structures of the load handling device, whereby each positioning device may be directed to a different place on the gripping means, such as the different corners of the container grabber. The location data may comprise a three-dimensional point cloud (3D point cloud) where each point comprises points in a two-dimensional (2D) plane as well as distance data associated with the points in relation to the positioning device. On the load handling device, the positioning device may be installed on the device moved horizontally above the load, whereby the 3D point cloud is formed in relation to the mounting location of the positioning device on the load handling device. The mounting location of the positioning device may be defined as a position in relation to the horizontally movable device, for example. So, a 3D point cloud is a set of points in a three-dimensional space. A three-dimensional space may be set by the axes x, y, and z in the Cartesian coordinate system, for example. Points in a 2D plane may be referred to as a 2D point map, whereby the 2D point map and the distance data associated with the points make up a 3D point cloud.

The points in a 3D point cloud may be presented in the Cartesian coordinate system having x and y axes, whereby the 2D plane may be determined as a plane defined by the x and y axes. In such a case, each point may be determined in the 2D plane by means of values (x, y) of the coordinate axes. The distance data associated with the points may be used to determine each point in the three-dimensional (3D) plane. The distance data may determine values of the points of the z axis in the Cartesian coordinate system, whereby the 3D point cloud is formed in relation to the horizontally movable device. In addition to distance data, grey scale and/or colour data may be associated with the points. Therefore, each point may be associated with, or a point may include the location of the point in the coordinate system, as well as grey scale data and/or colour data. The grey scale data may be light intensity data in the points or the grey scale definition. The distance data of a point may be in the point as a separate piece of information, or the coordinate value of a point may be used as the distance data.

In an embodiment, the gripping means may comprise a hook 204 which is connected by one or more ropes to the horizontally movable device. The horizontally movable device may have a hoisting mechanism connected to the rope, whereby the rope may be moved up and/or down to move the load attached to the hook, or the hook. The gripping means may, instead of a hook, be any gripping means referred to in the above, such as a paper roll grapple, suction loader, roll clamps, container grabber or magnet that may correspondingly be connected by a rope/ropes to the hoisting mechanism.

In the following the producing of a 3D point cloud will be described by using a ToF camera (Time of Flight) as an example of positioning devices. A ToF camera produces a two-dimensional image (2D) and distance data associated with the points of the 2D image. The points of the 2D image may be determined as pixels, each pixel being associated not only with a light brightness value (I) but also possibly with colour information, such as RGB information. RGB refers to the colours of the RGB colour model, red (R), green (G), and blue (B). The ToF camera attaches a distance (D), measured from the image sensor of the camera to an object visible in an image pixel, to the points of the 2D image. In the following, the operation principle of a ToF camera will be described in sufficiently close detail so as to enable the invention to be understood.

A conventional CCD camera (Charge-Coupled Device) includes a photosensitive cell manufactured by semiconductor technology and containing photosensitive photodiodes arranged in a regular raster. This raster, e.g. in a modern six-megapixel camera, may have up to 2816 rows and 2112 columns. A single photosensitive photodiode of this kind is called a pixel. When such a photodiode is exposed to light, typically led through a lens, the photodiode measures the intensity (I) of radiation of the light it received. A conventional CCD camera thus measures the intensity of light in every pixel of the raster.

A single photosensitive photodiode typically does not see colours, but colour filters of different colours may be placed on top of the photosensitive diode, which makes it possible to measure also the colours of an image by a CCD camera. The colour filters are usually red, green, and blue (R, G, B). To sum up, a conventional CCD camera measures the following values for every pixel of the image raster: (I,R, G,B), from which colour information is often omitted as unnecessary, though.

Today, in more and more applications the CCD cells are replaced by Complementary Metal-Oxide Semiconductor or CMOS cells that are similar in their basic operation but the measurement of light intensity, inter alia A/D (analogdigital) conversion, is performed by a cell circuit in itself when, while using CCD cells, it is performed outside the cell circuit.

The (ToF) camera differs from the conventional CCD (and CMOS) camera such that when the conventional camera measures light coming from the environment, the ToF camera independently produces the light it measures and for this purpose illuminates the object by a light source of its own. In addition to this, the ToF camera measures the time taken by the light produced by it to travel to the object visible in the image and to return, after reflection, to the image sensor of the camera. This measurement of travel time the ToF camera performs separately on every pixel of the image sensor (n, m). In addition to a conventional image, i.e. an intensity map I(n, m) and a possible colour map (R(n,m), G(n,m), B(n,m) or grey scale map, the ToF camera thus also produces a distance map (D(n,m) of its image area (7).

In the present embodiments, the measurement of travel time may be implemented e.g. in the ToF camera such that the light to be emitted to the object is modulated by a radio frequency (RF) carrier wave and the phase of the reflected light returned from the object is compared with the phase of the original RF carrier wave, which enables a phase shift between the emitted and reflected light to be determined. The phase shift may be determined in every image pixel independently. On the basis of the phase shift, it is possible to determine the travel time of light from the camera to the object and back separately for every image pixel. Finally, the distance (D) of the object to each image pixel is calculated utilizing the known propagation speed of light. The ToF camera may carry out the described distance measurement up to 100 times a second. Nowadays, the ToF cameras are capable of measuring distances typically up to about ten metres. It is to be noted that a distance may also be measured in the above-described manner for a group of image points, e.g. by averaging phase shifts of a pixel group or by selecting one pixel in the group of pixels joined together to represent the area formed by the pixel group.

In addition to the distance information D, the ToF camera typically also measures a normal black-and-white or colour camera image. To sum up, the ToF camera measures the following values for every pixel of the image raster: (I, R, G, B, D), where D is a 3D distance from the image sensor of the camera to the object visible in the image pixel (13). The colour information, however, may often be omitted.

The resolution of common ToF cameras may be 320×240 pixels, for example. With typical lens solutions, the size of one pixel corresponds to a size of about 1 mm to 1 cm in the object of measurement. The described ToF camera is particularly suitable for applications for mobile work machines since it does not contain any moving mechanical part and is thus very durable e.g. against impacts.

As will be obvious for a person skilled in the art, the method and equipment according to the invention may also be implemented with other positioning devices, such as a camera or sensor, than a 3D camera implemented by the ToF technology, which produces a 3D point cloud at a high frequency, such as 10 Hz or a higher frequency. The 3D point cloud therefore comprises at least distance information (D) to the image pixels of the depicted target, and in some embodiments at least the intensity and distance information (I, D) to the image pixels of the depicted target.

Examples of suitable technologies for implementing a positioning device also comprise, among others, a structured light camera, 3D laser scanner, a plenoptic camera, a stereo camera pair, and other 3D observation sensors of the environment. In a plenoptic camera, a special microlens lattice is installed in front of the image sensor. The plenoptic camera enables an image to be focused afterwards to a desired distance, for instance. Similarly, the stereo camera pair may be thought to produce intensity and distance information (I, D).

Figure 3:
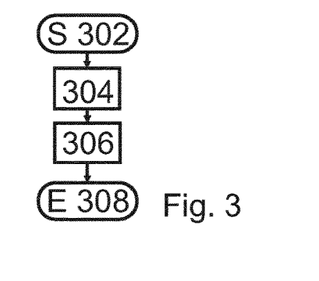
FIG. 3 shows a method according to an embodiment for positioning gripping means.

FIG. 3 shows a method according to an embodiment for positioning the gripping means. The method may commence 302 when at least one positioning device is installed in such a manner that the positioning device may be directed to the gripping means from its mounting location. The positioning device may be installed on the load handling device in accordance with what was described in connection with FIG. 2.

A 3D point cloud is formed 304 of the gripping means of the load handling device in relation to the device which is moved horizontally above a load in the load handling device and to which the gripping means are connected to be moved in the vertical direction. The 3D point cloud may be formed by a positioning device, or a positioning device may provide information for forming the 3D point cloud. The gripping means are positioned 306 in relation to the horizontally movable device by comparing the formed 3D point cloud to at least one 3D model of the gripping means. 3D models may have been formed in advance by the positioning device, whereby the method allows the gripping means to be positioned during load handling. So, both the 3D models and the 3D point cloud formed 304 of the gripping means of the load handling device may be formed by the positioning device. The positioning device may be installed on the load handling device on the device moved horizontally above the load, whereby the 3D point cloud and the 3D models are formed in the positioning device in relation to the mounting location of the positioning device on the load handling device.

In an embodiment, the gripping means are positioned 306 by comparing the formed 3D point cloud to a plurality of 3D models of the gripping means, which correspond to the various locations of the gripping means in relation to the horizontally movable device. The gripping means may be positioned by processing the formed 3D point cloud and the 3D model(s) of the gripping means by a computer vision algorithm. The computer vision algorithm may comprise a plurality of computing rounds that process the 3D point cloud and 3D models. A 3D model may be a set of points in a 3D point cloud. The 3D model forms a 3-dimensional pattern of the gripping means, such as a hook. The various gripping means may have their own 3D models.

In an embodiment, the gripping means are positioned 306 by comparing the formed 3D point cloud with one or more 3D models of the gripping means, and the 3D model that best corresponds to the formed 3D point cloud is used to position the gripping means. In the positioning of the gripping means, information on the assumed height of the gripping means may be utilized to define the 3D model that best corresponds to the 3D point cloud. The information on the assumed height may be obtained from the load handling device, such as the control system of the load handling device. The information on the assumed height may be obtained by a separate inquiry or as continuous updates. If the latest assumed height is not available, a rough estimate on location information may be used, such as the previous assumed height. Conditions may be set for the use of the previous height. The conditions may comprise one or more of the following: a time value for which the assumed height is valid, and the operating mode of the load handling device. The operating mode of the load handling device may be one of the following, or a combination of some of the following: a load is fixed to the gripping means, a load is being moved, a load has stopped, the direction of travel of the load (expressed by x, y, and z axis, for example), the gripping means are moving, the gripping means have stopped. The modes in the above were defined on the basis of the mobility or immobility of the gripping means Additional modes may be defined on the basis of the mobility or immobility of another part, such as the hoist trolley, of the load handling device, or the entire load handling device.

The 3D model that best matches with the 3D point cloud may mean the similarity between the 3D point cloud and 3D model. A comparison between the 3D model and 3D point cloud may produce a usability number, such as a number 0-100, in which case the 3D model providing the highest usability number may be used to position the gripping means. For the comparison between the 3D point cloud and 3D model, methods dealing with the three-dimensional data may be used, such as the so-called "Point Cloud Registration" method, of which an example is presented by J. Besl and Neil D. McKay in the article "*A Method for Registration of* 3-*D Shapes IEEE Transactions on Pattern Analysis and Machine Intelligence, vol* 14, *no* 2 *Feb.* 1992".

The 3D models may depict the gripping means in different locations, such as at different distances and/or positions, in relation to the horizontally movable device. The formed 3D point cloud may define the gripping means and their location by one or more of the following factors: the distance of the gripping means to the horizontally movable device, the position of the gripping means in a two-dimensional plane, the volume of the gripping means, the shape of the gripping means, the skew of the gripping means, and the inclination of the gripping means. The distance of the gripping means to the horizontally movable device may be, for example, height.

In an embodiment for positioning the gripping means, the 3D point cloud is filtered by removing points from the 3D point cloud. The points to be removed may essentially be points that represent the environment of the gripping means, such as the ground of floor, in the operating area of the load handling device. Points representing the floor or ground may be determined as the distance of the points from the camera and/or the horizontally movable device. So, the points representing the floor or ground are at a distance where the load being handled is at its lowest position in the operating area of the load handling device. Secondly and/or additionally, a 3D point cloud may be filtered by using information on the assumed height of the gripping means and/or rough estimate on the location information of the gripping means in a plane, such as the position on the previous computing round. The points above and below the assumed height may be filtered off of the 3D point cloud. A safety margin may be used in the filtering, whereby the points that exceed the assumed height added by the safety margin, and the points that are below the assumed height subtracted by the safety margin, may be removed. Correspondingly, extra points may be removed in the lateral direction, if the position of the gripping means at the previous instant of time is known.

After filtering, a subset of the 3D point cloud remains, which may be adapted to the 3D model that best corresponds to it, by comparing the 3D model and 3D point cloud as described in the above, for example. In the adaptation, the 3D model may be scaled and the best possible parameter values sought to determine the location of the gripping means. The location of the gripping means may be determined by one or more of the following parametres: the distance of the gripping means to the horizontally movable device, the position of the gripping means in a two-dimensional plane, the volume of the gripping means, the shape of the gripping means, the skew of the gripping means, and the inclination of the gripping means. The distance of the gripping means to the horizontally movable device may be, for example, height. The parameter values may be absolute or relative values by means of which the location of the gripping means is determined or the location of the gripping means is scaled.

The hook, for example, may be positioned 306 by comparing the formed 3D point cloud to the 3D model made of the hook. The 3D model that best matches with the formed 3D point cloud is used to position the hook. The 3D models of the hook may comprise 3D models at different heights from the ground. So, the 3D models correspond to the hook as seen at different distances from the horizontally movable device. The hook from the viewpoint of the camera looks slightly different at different heights, for example. Because the hook is smaller when far away from the camera than close to the positioning device, such as a camera, also the 3D models corresponding to different heights are of different sizes accordingly. The differences are influenced by, among other things, the distance of the hook itself and the orientation of the hook, inclination and skew at different heights, and the location of the hook in relation to the optical centre of the camera.

In an embodiment, the 3D models correspond to the positions of the gripping means, each of the positions of the gripping means being possible to determine by one or more of the following factors: the distance of the gripping means to the horizontally movable device, the position of the gripping means in a two-dimensional plane, the volume of the gripping means, the shape of the gripping means, the skew of the gripping means, and the inclination of the gripping means. The location of the gripping means describes the position and place of the gripping means in relation to the horizontally movable device. The locations may be determined by the required number of coordinates in the Cartesian coordinate system, by x, y, and z axis, for example, in relation to the horizontally movable device of the load handling device. The distance to the horizontally movable device may be the height.

The method ends 308 when the gripping means have been positioned in relation to the horizontally movable device, whereby the location of the gripping means may be determined by one or more of the following: the distance of the gripping means to the horizontally movable device, the position of the gripping means in a two-dimensional plane, the volume of the gripping means, the shape of the gripping means, the skew of the gripping means, and the inclination of the gripping means. The location may be determined in a three-dimensional space, for example in the x, y, z coordinate system, where x and y, for example, determine the location of the gripping means in a two-dimensional plane and z the height of the gripping means.

Figure 4:
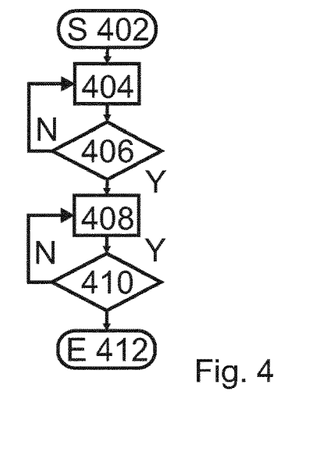
FIG. 4 shows a method according to an embodiment for positioning gripping means by 3D models corresponding to the positions of the gripping means.

FIG. 4 shows a method according to an embodiment for positioning gripping means by 3D models corresponding to the locations of the gripping means. The method may begin 402 when a 3D point cloud has been formed 304 of the gripping means of the load handling device in relation to the device which is moved horizontally above a load in the load handling device and to which the gripping means are connected to be moved in the vertical direction after phase 304 of FIG. 3, for example. The method of FIG. 4 may be carried out when the gripping means are being positioned in relation to the horizontally movable device at phase 306 of FIG. 3. In the method of FIG. 4, each phase 404, 408 may be performed once or a plurality of times.

With reference to FIG. 4, the height of the gripping means is determined 404. The height of the gripping means may be determined on the basis of the 3D point cloud by, for example, comparing the formed 3D point cloud to the 3D models corresponding to the different heights of the gripping means, on the basis of the distance information measured by a positioning device installed above the gripping means, and/or making use of the assumed height of the gripping means. The height of the gripping means may be determined as the height of the top surface of the gripping means. The heights of the gripping means may comprise heights at which the gripping means are moved. When 3D models are used to determine the height of the gripping means, 3D models may be determined for the desired heights in order to achieve the positioning accuracy aimed at. The 3D models of the gripping means at different heights are advantageously of different sizes, whereby the definition of the 3D model that best matches the 3D point cloud may be carried out by comparing the sizes of the 3D model and the formed 3D point cloud.

If 406 the height of the gripping means can be determined, the method continues to phase 408 at which the location of the gripping means is made more specific. For example, if 406 the formed 3D point cloud essentially corresponds to a 3D model corresponding to a specific height, the height of the gripping means may be determined to correspond to the height of the specific 3D model. If 406 the formed point cloud does not correspond to a 3D model corresponding to a specific height, the formed 3D point cloud may be compared 404 to a 3D model corresponding to a second height, until a 3D model corresponding to the formed point cloud is found, or all the 3D models corresponding to different heights have been gone through.

After this, the location of the gripping means will be determined 408 more specifically, whereby the location of the gripping means may be determined in addition to the height, such as the distance of the gripping means to the horizontally movable device, by one or more of the following: the position of the gripping means in a two-dimensional plane, the volume of the gripping means, the shape of the gripping means, the skew of the gripping means, and the inclination of the gripping means. This way the location of the gripping means may be determined in the x, y, z coordinate system, for example.

In an embodiment, the location of the gripping means may be determined 408 more specifically by using 3D models, whereby the formed 3D point cloud is compared to the 3D models of the gripping means, which correspond to the determined height and which determine at least one or more of the following: the positions of the gripping means in a two-dimensional plane, the volumes of the gripping means, the shapes of the gripping means, the skew of the gripping means, and the inclination of the gripping means. So, this way the 3D point cloud may be compared to the 3D models that well correspond to the formed 3D point cloud as regards height. The location in a two-dimensional plane, volume, shape, skew and inclination may be determined by the use of several, such as three or just two dimensions of the coordinate system. The location of the gripping means, such as the centre point, in a two-dimensional plane may be determined by adapting a 3D point cloud to a 3D model. On the other hand, height may be determined by using one dimension of the coordinate system. Because the comparison is made to height-specific 3D model in which height is essentially restricted, the work and consequently time put in the definition of the 3D model corresponding to the formed 3D point cloud can be limited.

If, as the result of the comparison of the 3D point cloud and 3D models, the 3D point cloud can be adapted to the 3D model that best corresponds to it, the gripping means may be positioned by means of the 3D model in relation to the horizontally movable device, and the method ends 412.

In an embodiment, the location of the gripping means may be determined 408 more specifically by using, in addition to the 3D models, 2D models of the gripping means for positioning. A 3D point cloud may be formed of one or more 2D images that represent the gripping means in the horizontal plane. So, the horizontal plane may be parallel to the direction of travel of the horizontally movable device to facilitate the positioning of the gripping means.

A 3D point cloud may be formed by a stereo camera pair, which produces two grey scale images or colour images, such as RGB image. When a ToF camera is used for forming a 3D point cloud, a grey scale image or colour image is also obtained as a by-product. However, a 3D point cloud may be of poor quality, which may be detected as noise or roughness. So, it may be worthwhile to improve a 3D point cloud to achieve adequate accuracy for the positioning of, for example, the centre point of the gripping means. The 2D images produced by a stereo camera pair or a ToF camera are usually precise, so with 2D image data, positioning made on the basis of a 3D point cloud and 3D model may be improved, as explained in the following.

The accuracy of positioning may be improved by scaling the 2D model of the gripping means for the determined 404 height of the gripping means, and adapting the scaled 2D model to said 2D image in order to determine the skew and position of the gripping means in said two-dimensional plane. The scaled 2D model may be adapted in the 2D image so that the scaled 2D model best corresponds to the gripping means in the 2D image. The correspondence may be determined by utilizing the grey scale correlation in the 2D model and 2D image, and/or geometric features of the hook. The 2D model to be used and/or scaling parametres may be chosen on the basis of positioning 408 based on the 3D model of the gripping means. With the aid of scaling, a 2D model may be brought to the same plane with the 2D image. For example, positioning based on the 3D model of the gripping means may produce x, y, z coordinate data, out of which the z coordinate represents height. In such a case, the z coordinate data may be used to scale a 2D model to a 2D image.

In an embodiment, the 2D image may be filtered, whereby an outlined review area is determined out of the 2D image, and the 2D model is adapted to said outlined review area. The outlined review area may be determined by positioning carried out based on the 3D point cloud and the 3D model of the gripping means. For example, in the positioning made on the basis of a 3D point cloud and the 3D model of the gripping means, the location of the gripping means in the x, y, z coordinate system may be obtained. The x and y coordinates may be in the same plane with the 2D images, whereby the x and y coordinate data may be used to outline the 2D image. The outlining may be performed, for example, by assuming that the x and y coordinates are the centre of the gripping means, whereby the review area may be selected from around them. The review area may be scaled, when needed, based on the height, such as the z coordinate, of the gripping means. The advantage of the outlining is that the amount of data to be processed is limited, whereby the processing of a 2D model in relation to a 2D image will become more precise and more effective.

If 410 the formed point cloud does not correspond to the 3D model, the formed 3D point cloud is compared 408 to a second 3D model corresponding to the determined height until the corresponding 3D model is found, or all the 3D models have been gone through. When the gripping means have been positioned in relation to the horizontally movable device, the method ends 412.

In an embodiment, the gripping means may be positioned with the aid of height data and the 3D model that corresponds to the height. The formed 3D point cloud is compared 408 to a plurality of 3D models of the gripping means, corresponding to the determined height. The 3D point cloud may be formed as described at phase 402 of FIG. 4. For gripping means located at a particular height, a location may be determined with a 3D model corresponding to the height in question. The 3D model may define one of more of the following: the position of the gripping means in a two-dimensional plane, the volume of the gripping means, the shape of the gripping means, the skew of the gripping means, and the inclination of the gripping means.

Figure 5:
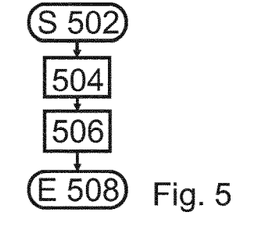
FIG. 5 shows a method according to an embodiment for controlling a load handling device.

FIG. 5 shows a method according to an embodiment for controlling a load handling device. The method may begin 502 when the gripping means of the load handling device have been positioned by using a 3D point cloud, as described at step 306 of FIG. 3, for example. The location of the gripping means may be forwarded to the control system of the load handling device, such as a Program Logic Controller (PLC).

A new location is defined 504 for the gripping means in relation to the device moved horizontally in the load handling device above the load. The new location may be a correction to the current location of the gripping means, or an entirely new location, which may correspond to the 3D model of the gripping means, which defines one or more of the following: the distance of the gripping means to the horizontally movable device, the position of the gripping means in a two-dimensional plane, the volume of the gripping means, the shape of the gripping means, the skew of the gripping means, and the inclination of the gripping means. The distance of the gripping means to the horizontally movable device may, in practise, be the height of the gripping means. The new location may be received from a user through the user interface of the load handling device. The new location may acts as the reference space in the control system of the load handling device, to which the gripping means are to be controlled. The new location may be determined by using one or more of the following: the distance of the gripping means to the horizontally movable device, the position of the gripping means in a two-dimensional plane, the volume of the gripping means, the shape of the gripping means, the skew of the gripping means, and the inclination of the gripping means. The new location may be determined in a three-dimensional space, for example in the x, y, z coordinate system, where x and y, for example, determine the location of the gripping means in a two-dimensional plane and z the height of the gripping means.

The gripping means are controlled 506 from their current location towards the new location defined 504 for the gripping means by positioning the gripping means with the 3D model that corresponds to the new location. There are dedicated 3D models for the new and current location of the gripping means, whereby controlling may be implemented by forming a 3D point cloud of the gripping means, as described above in connection with step 304 of FIG. 3, for example. The gripping means may be positioned in the new location, in a manner described in connection with step 306 of FIG. 3, for example, when the 3D model corresponding to the location of the gripping means is the 3D model corresponding to the new location. Controlling may be automatic or at least partly assisted by the user through the user interface. In controlling, the positioning of the gripping means with the aid of a 3D model is used to form a control command used to control the gripping means from the current location to the new location. In controlling, an error variable may be established between the reference space and the current location of the gripping means, whereby the load handling device and/or gripping means are controlled towards the reference space on the basis of the error variable. Controlling may be continuously updated based on new measurements until the reference space is reached.

Controlling may be carried out by determining the difference between the new location and current location of the gripping means, after which controlling may be used to minimize the difference. The difference may be determined in a 3D coordinate system by means of vector computing, for example. The difference may be calculated on the basis of the 3D models of the new and current locations. The calculated difference may be presented to the user on the user interface as absolute values, such as metres, or relative values, such as percent.

The method ends 508 when the gripping means are at the new location that the 3D model corresponds to.

Figure 6:
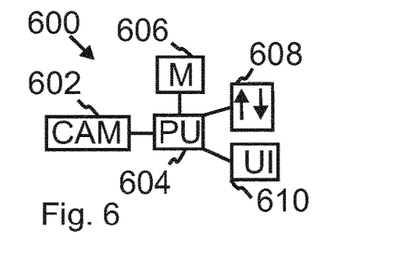
FIG. 6 shows a device according to an embodiment.

FIG. 6 shows a device according to an embodiment. With the device, the features of the embodiments described in the above may be implemented. The device 600 comprises a positioning device (CAM) 602 for forming a 3D point cloud of the operating area of the load handling device, a processor (PU) 604, a memory (M) 606, which are interconnected in such a way that data, such as the 3D point cloud or data for forming a 3D point cloud, can be transferred from the positioning device to the processor, which may process the received data to position the gripping means. The processor and memory may be included in the positioning device, in which case the point cloud can be processed in the positioning device. The processor and memory may form a processing unit in a data processing apparatus that may be a computer, positioning device, or a PLC, which are used in hoisting devices.

In an embodiment, the device 600 is one of the load handling devices described in the above, to which positioning device is installed according to the example of FIG. 2, for example. The device comprises equipment 608 for moving a load. Examples of equipment for moving a load may comprise gripping means and a mechanism moving them, such as a hoisting mechanism. The processor may send information and/or messages to the equipment 608, whereby the equipment may cause the gripping means and a load possibly attached to them to move in relation to the load handling device and/or within the operating area of the load handling device. On the other hand, the processor may receive information and/or messages from the equipment. The information and/or messages may comprise, for example, control information such as information on the assumed height of the gripping means. The received information and/messages may be used to position the gripping means in relation to the horizontally movable device by comparing the formed 3D point cloud and the 3D model(s) of the gripping means. On the basis of positioning, control messages may be formed which cause the gripping means and a load possibly attached to them to move in relation to the load handling device and/or within the operating area of the load handling device. This way a load may be moved to locations, such as at distances of the horizontally movable device, to positions in a two-dimensional plane, to the desired skew and the desired inclination.

In an embodiment, the device 600 comprises a user interface unit (UI) 610, which is connected to the processor so that the 3D point cloud or the image data containing the 3D point cloud may be transferred from the camera to the user interface unit under control by the processor. The image data and/or 3D point cloud may be utilized as a visualization aid for the user by, for example, using the methods of augmented reality and/or be presented to a user on the user interface unit. The user may be the operator of the load handling device, for example. The user interface unit may comprise a display, such as a liquid crystal display (LCD). The display can be used for displaying information, for instance the sight apparatus, to the user. The display may be a touch screen, in which case instructions may be received from the user through the screen, including control commands to move the gripping means and/or load. The display can be implemented by a tablet computer, for instance, in which case the connection for transmitting data and/or image data can be implemented over a wireless data communications connection, such as a wireless local area network (WLAN) connection based on the IEEE 802.11 standard, or a Bluetooth connection.

The units in FIG. 6 may be electrically connected to each other by electric conductors or over an electric bus, for instance. Wireless connections, such as IEEE 802.11 WLAN connections, or Bluetooth, are also possible. The electric connection or bus may be implemented by a Profibus field bus, Ethernet connection and/or computer bus. The memory may store program code, such as computer program code executable in the processor, whereby an operation or operations according to the embodiment will be realized.

It should be noted that the functions of the device according to the embodiments described in the above can be implemented using one or more units. Units may be interconnected, or the functions of the unit described in the above may be distributed to be performed in other units. The devices according to the described embodiments may be implemented by a processing unit of a data processing apparatus, positioning device, load handling or similar means, which bring about the method according to the embodiment described in the above, in which a 3D point cloud is formed of the gripping means of a load handling device in relation to a device which is horizontally moved above the load in the load handling device and to which the gripping means are connected to be moved in the vertical direction, the gripping means are positioned in relation to the horizontally movable device by comparing the formed 3D point cloud and the 3D model(s) of the gripping means.

The technologies of the above embodiments may be implemented by a plurality of different means so that the load handling device, or a device performing a function described above, comprises prior art means and means for forming a 3D point cloud of the gripping means of the load handling device in relation to in relation to a device which is horizontally moved above the load in the load handling device and to which the gripping means are connected to be moved in the vertical direction, and to position the gripping means in relation to the horizontally movable device by comparing the formed 3D point cloud and the 3D model(s) of the gripping means.

The functions of the device according to the embodiments described above can be implemented using means corresponding to them. Each function can be implemented using its own means or several functions can be implemented using the same means. In an example, the techniques of the embodiments described above can be implemented using equipment that contains one or more devices, software comprising one or more modules, firmware, or a combination of all these. The firmware or software can be implemented by modules (e.g. as procedures, functions etc.) that implement the functions described above. Program codes can be stored on any suitable data storage means, memory unit or product readable by a processor and/or computer and executed by one or more processors and/or computers. The data storage medium may be implemented internally or externally to the processor and/or computer, in which case it may be connected communicatively to the processor and/or computer in various known ways.

In an embodiment, the load handling device or a part thereof comprises processing means that are configured to execute functions described in an embodiment.

In an embodiment, at least one processor, memory, and computer program code form the processing means according to the embodiment for executing functions according to an embodiment.

An embodiment comprises a computer program included in a computer-readable storage medium, whereby the computer program comprises program code which, when executed on a processor or computer, produces functions according to an embodiment.

The embodiments can be implemented as a computer process that is defined by a computer program. The computer program may be in source code format, object code format or an intermediate format, and the computer program can be stored on a storage medium that may be any piece or apparatus that is capable of storing the computer program. The computer program may be stored on a computer program distribution medium that is computer-readable or processor-readable. The computer program distribution means may comprise a storage medium, computer memory, read-only memory (ROM), electric carrier wave, telecommunications signal, and software distribution package, for instance.

An embodiment comprises a computer program product for a computer, the computer program product comprising program code portions for executing functions according to any of the embodiments described above.

It is apparent to a person skilled in the art that as technology advances, the basic idea of the invention may be implemented in many different ways. The invention and its embodiments are thus not restricted to the examples described above but may vary within the scope of the claims.

The invention claimed is:

1. A method which comprises steps of:
   forming a 3D point cloud of gripping means of a load handling device in relation to a device which is moved horizontally above a load in the load handling device and to which the gripping means are connected to be moved in a vertical direction, whereby the 3D point cloud is formed from at least one 2D image which depicts the gripping means in a two-dimensional plane which is parallel to a direction of movement of the horizontally movable device; and
   positioning the gripping means in relation to the horizontally movable device, wherein a height of the gripping means is determined on a basis of the 3D point cloud by comparing the formed 3D point cloud to at least one 3D model of the gripping means, and a 2D model of the gripping means is scaled to said height of the gripping means, and the scaled 2D model is adapted to said 2D image in order to determine a skew and a location of the gripping means in said two-dimensional plane, wherein the gripping means comprises a hoist and at least one of a hook, a magnet, lines, paper roll grapple, suction loader, clamps, or a container grabber.

2. The method as claimed in claim 1, wherein the formed 3D point cloud is compared to a plurality of 3D models of the gripping means, which correspond to different locations of the gripping means in relation to the horizontally movable device.

3. The method as claimed in claim 1, wherein the gripping means are positioned on a basis of a 3D model that best corresponds to the 3D point cloud of the gripping means.

4. The method as claimed in claim 1, wherein the location of the gripping means is determined by 3D models of the gripping means, defining at least one or more of following: distances of the gripping means to the horizontally movable device, locations of the gripping means in the two-dimensional plane, volumes of the gripping means, shapes of the gripping means, skews of the gripping means, or inclinations of the gripping means.

5. The method as claimed in claim 1, wherein:
the height of the gripping means is determined by comparing the 3D point cloud to 3D models corresponding to different heights of the gripping means; and
the gripping means are positioned by comparing the 3D point cloud to the 3D models corresponding to the determined height of the gripping means, which define at least one or more of following: positions of the gripping means in the two-dimensional plane, volumes of the gripping means, shapes of the gripping means, skews of the gripping means, or inclinations of the gripping means.

6. The method as claimed in claim 1, wherein an outlined review area is determined out of said 2D image, and the 2D model is adapted to said outlined review area.

7. The method as claimed in claim 1, wherein the 3D point cloud is filtered by using at least one of the following: information on an assumed height of the gripping means, an assumed distance to a ground, or an estimate on a location information of the gripping means in the two-dimensional plane which is parallel to the direction of movement of the horizontally movable device.

8. The method as claimed in claim 7, wherein conditions of use have been set on the assumed height of the gripping means, comprising one or more of following: a time value for which the assumed height is valid, or an operating mode of the load handling device.

9. The method as claimed in claim 1, wherein an error variable is formed between a current location and a new location of the gripping means, and the gripping means are controlled towards the new location on a basis of the error variable.

10. The method as claimed in claim 1, wherein the 3D models represent the gripping means at different heights thereof in relation to the horizontally movable device.

11. The method as claimed in claim 1, wherein the load handling device is a crane.

12. A load handling device, comprising:
at least one processor, and a memory in which computer program code has been stored; and
a positioning device which is directed to the gripping means of the load handling device,
whereby the memory, computer program code, and positioning device are, together with the processor, configured to produce the method as claimed in claim 1.

13. A non-transitory computer-readable memory, which comprises a computer program having computer-executable program code instructions, when executed on a computer, instructing the computer to perform the method according to claim 1.

14. The method as claimed in claim 7, wherein the location information of the gripping means is a position on a previous computing round.

15. The method as claimed in claim 11, wherein the load handling device is a bridge crane, a rubber-tired gantry crane or a rail-mounted gantry crane.

* * * * *